US010810353B2

(12) United States Patent
Clopp et al.

(10) Patent No.: US 10,810,353 B2
(45) Date of Patent: Oct. 20, 2020

(54) PLAYER SOFTWARE ARCHITECTURE

(71) Applicant: RMG Networks Holding Corporation, Dallas, TX (US)

(72) Inventors: George Clopp, Plano, TX (US); Eric R. Meyer, Allen, TX (US); Thamer Hummadi, McKinney, TX (US)

(73) Assignee: RMG Networks Holding Corporation, Dallas, TX (US)

( * ) Notice: Subject to any disclaimer, the term of this patent is extended or adjusted under 35 U.S.C. 154(b) by 0 days.

(21) Appl. No.: 16/436,313

(22) Filed: Jun. 10, 2019

(65) Prior Publication Data
US 2019/0377616 A1 Dec. 12, 2019

Related U.S. Application Data

(60) Provisional application No. 62/682,483, filed on Jun. 8, 2018, provisional application No. 62/682,578, filed
(Continued)

(51) Int. Cl.
| G06F 9/54 | (2006.01) |
| G06F 40/106 | (2020.01) |
| B64C 39/02 | (2006.01) |
| B64D 47/02 | (2006.01) |
| G05D 1/00 | (2006.01) |
| G06F 3/14 | (2006.01) |
| G06K 7/10 | (2006.01) |
| G06Q 10/10 | (2012.01) |
| H04L 29/08 | (2006.01) |
| H04L 12/24 | (2006.01) |
| G06F 40/186 | (2020.01) |
| G09F 9/30 | (2006.01) |

(52) U.S. Cl.
CPC .......... *G06F 40/106* (2020.01); *B64C 39/024* (2013.01); *B64D 47/02* (2013.01); *G05D 1/0016* (2013.01); *G05D 1/0022* (2013.01); *G06F 3/1423* (2013.01); *G06F 9/541* (2013.01); *G06F 40/186* (2020.01); *G06K 7/10297* (2013.01); *G06Q 10/1091* (2013.01); *H04L 41/24* (2013.01); *H04L 67/125* (2013.01); *B64C 2201/12* (2013.01); *B64C 2201/146* (2013.01); *G09F 9/30* (2013.01); *H04L 67/10* (2013.01)

(58) Field of Classification Search
CPC .................................................... G06F 9/541
USPC ........................................................ 719/328
See application file for complete search history.

(56) References Cited

U.S. PATENT DOCUMENTS 9,588,803 B2 * 3/2017 Howell ..................... G06F 8/60
2005/0039206 A1 2/2005 Opdycke
(Continued)

*Primary Examiner* — Andy Ho
(74) *Attorney, Agent, or Firm* — Husch Blackwell LLP

(57) ABSTRACT

Embodiments disclosed herein are related to a method that can include discovering, by a platform abstraction layer (PAL), configuration data related to hardware associated with a media display, generating and supporting, by the platform abstraction layer, a common set of platform application programming interfaces (APIs) for displaying content on the media display according to the discovered hardware, receiving, by a platform shim, check-in instructions from a content management system, and causing, by a media player engine, the media display to display the content in accordance with the check-in instructions by using the common set of platform APIs generated by the PAL.

20 Claims, 11 Drawing Sheets

Related U.S. Application Data on Jun. 8, 2018, provisional application No. 62/682,608, filed on Jun. 8, 2018.

(56) References Cited

U.S. PATENT DOCUMENTS

| | | |
|---|---|---|
| 2008/0244682 A1* | 10/2008 | Sparrell ............... H04N 21/658 725/134 |
| 2009/0144157 A1 | 6/2009 | Scacino et al. |
| 2012/0324342 A1 | 12/2012 | Donley |
| 2015/0070340 A1 | 3/2015 | Trachtenberg et al. |
| 2019/0141085 A1* | 5/2019 | Tsaplin ............... H04L 65/4069 |

* cited by examiner

PLAYER SOFTWARE ARCHITECTURE

CROSS REFERENCE TO RELATED APPLICATIONS

This application claims priority to U.S. Provisional Patent Application No. 62/682,483 filed Jun. 8, 2018 and titled "Scriptlets", U.S. Provisional Patent Application No. 62/682,578 filed Jun. 8, 2018 and titled "Content Builder", and U.S. Provisional Patent Application No. 62/682,608 filed Jun. 8, 2018 and titled "Player Software Architecture". U.S. Application Nos. 62/682,483; 62/682,578; and 62/682,608 are hereby incorporated by reference.

FIELD

The present disclosure relates generally to digital signage systems and, more particularly, to a player software architecture suitable for digital signage systems.

BACKGROUND

Digital signage systems make use of displays that are controlled to present different types of content. Often these systems display advertising materials and are part of a network of displays on which an advertiser can buy display time or owned by the advertiser. The displays are often controlled by computer systems such as a media player system and are presented to a viewer in such a fashion that it appears that the screen is an autonomous device. Digital signage is also used for a number of other purposes including corporate displays used to provide information and direction to users, emergency service displays used to display real time emergency caller information, industrial displays used to display real time production or product data, conference displays used to display upcoming meetings, trade show displays used to display marketing and product information, airport displays that provide incoming flight information as well as numerous other uses generally known to those skilled in the art.

SUMMARY

In one embodiment, a disclosed digital signage system may include a content management system coupled to a communication network, a first media display, and a first media player system coupled to the communication network. The first media player system may include a first processor that may execute instructions, a first operating system (OS), and a first platform abstraction layer (PAL) including instructions executable by the first processor that may access the first media display. The first media player system may also include a first platform shim including instructions executable by the first processor that may execute on the first OS, support a common set of shim application programming interfaces (APIs) that may access the first media display using the first PAL, and download a media player engine from the content management system. The media player engine may include instructions executable by the first processor that may display first content supplied by the content management system on the first media display using the common set of shim APIs.

In a number of the disclosed embodiments of the digital signage system, the digital signage system may also include a second media display and a second media player system coupled to the communication network. The second media player system may include a second processor that may execute instructions, a second OS, and a second PAL including instructions executable by the second processor that may access the second media display. The second media player system may also include a second platform shim including instructions executable by the second processor that may execute on the second OS, support the common set of shim APIs that may access the second media display using the second PAL, and download the media player engine from the content management system. The media player engine may further include instructions executable by the second processor that may display second content supplied by the content management system on the second media display using the common set of shim APIs of the second platform shim. The first media display may be different than the second media display, and the first OS may be different than the second OS.

In a number of the disclosed embodiments of the digital signage system, the first media player system may also transmit first check-in data to the content management system using the first platform shim and receive first check-in instructions from the content management system. The first check-in instructions may be based on the first check-in data, and the display of the first content on the first media display may be based on the first check-in instructions.

In a number of the disclosed embodiments of the digital signage system, the first platform shim may further include instructions executable by the first processor that may transmit first check-in data to the content management system and receive first check-in instructions from the content management system based on the first check-in data, wherein the display of the first content on the first media display may be based on the first check-in instructions.

In a number of the disclosed embodiments of the digital signage system, the first platform shim may further include instructions executable by the first processor that may transmit first heartbeat data to the content management system and receive first heartbeat actions from the content management system based on the first heartbeat data. The media player engine of the first media player system may further include instructions executable by the processor that may implement the received heartbeat actions.

In a number of the disclosed embodiments of the digital signage system, the media player engine of the first media player system may further include instructions executable by the first processor that may schedule the display of the first content on the first media display.

In a number of the disclosed embodiments of the digital signage system, the media player engine of the first media player system may further include instructions executable by the first processor that may transmit first player data for the second media player system. The media player engine of the second media player system may further include instructions executable by the second processor that may receive the first player data. The second content displayed on the second media device may be further based on the first player data.

In a number of the disclosed embodiments of the digital signage system, the media player engine of the first media player system may utilize point-to-point communication to transmit the first player data for the second media player system to the second media player system.

In a number of the disclosed embodiments of the digital signage system, the media player engine of the first media player system may transmit the first player data for the second media player system to the content management system, and the content management system may transmit the received first player data to the second media player system.

In a second embodiment, a disclosed content creation system may include a communication network, one or more displays including a first display, a processor operable to execute instructions, a platform abstraction layer (PAL) including instructions executable by the processor that may access the first display, a platform shim including instructions executable by the processor that may execute on the OS and support a common set of shim application programming interfaces (APIs) to access the first display using the PAL, a media player engine including instructions executable by the processor that may display content on the first display using the common set of shim APIs, and an integrated development environment (IDE) including a user interface. The content creation system may also include a content builder comprising instructions executable by the first processor that may, in response to input from the user interface of the IDE, create a layout including one or more content elements provided by one or more of a digital asset manager, a data aggregation manager, and the communication network, display the layout being created in the IDE on the first display, and display a substantially instantaneous preview of an accurate display of the layout including the one or more content elements on one of the one or more displays that may be based on an occurrence of a first preview event using the media player engine and the common set of shim APIs.

In a number of the disclosed embodiments of the content creation system, the content builder may also, when the layout has been created, post process the layout using a post processor of the content builder to create additional content in a final version of the layout.

In a number of the disclosed embodiments of the content creation system, the additional content may be created using at least one of a cascading style sheets (CSS) compliant design language and an European computer manufacturers association script (ECMAscript) compliant scripting language in the final version of the layout.

In a number of the disclosed embodiments of the content creation system, the content builder may also display a substantially instantaneous preview of an accurate display of the final version of the layout including the additional content on one of the one or more displays that may be based on an occurrence of a second preview event using the media player engine and the common set of shim APIs.

In a number of the disclosed embodiments of the content creation system, the content builder may also, when the final version of the layout has been created, publish the final version of the layout for display on one or more of a digital signage device, a personal computer, a mobile computer device, and a media player system.

In a number of the disclosed embodiments of the content creation system, the content builder may also, when the final version of the layout has been created, save the final version of the layout to be utilized for a template for other layouts.

In one embodiment, a disclosed controller extension delivery system may include a content management system coupled to a communication network, a first media player system coupled to the communication network. The first media player system may include a first controller extension engine and a first media player engine. The first media player system may display first content on a first media display of the digital signage system using the first media player engine. The first media player system may also transmit first heartbeat data to the content management system and receive first heartbeat actions from the content management system indicating that a first controller extension is to be downloaded to the first media player system. The first heartbeat actions may be based on the first heartbeat data. The first media player system may further download the first controller extension from the content management system based on the first heartbeat actions and execute the first controller extension using the first controller extension engine. The first controller extension may request first internet of things (IoT) device data from first IoT devices of the digital signage system and may cause the first content displayed on the first media device by the first media player engine to change based on the first IoT device data.

In a number of the disclosed embodiments of the controller extension delivery system, the content creation system may also include a second media player system coupled to the communication network. The second media player system may include a second controller extension engine and a second media player engine. The second media player system may display second content on a second media display of the digital signage system using the second media player engine, download a second controller extension from the content management system based on second heartbeat actions received from the content management system, and execute the second controller extension using the second controller extension engine. The second controller extension may request second internet of things (IoT) device data from second IoT devices of the digital signage system and cause the second content displayed on the second media device by the second media player engine to change based on the second IoT device data.

In a number of the disclosed embodiments of the controller extension delivery system, the controller extension delivery system may also include a second media player system coupled to the communication network. The second media player system may include a second controller extension engine and a second media player engine. The second media player system may download a second controller extension from the content management system based on second heartbeat actions received from the content management system and execute the second controller extension using the second controller extension engine. The second controller extension may transmit second controller extension data to the first controller extension executing on the first media player system. The first controller extension may cause the first content displayed on the first media device by the first media player engine to change based on the second controller extension data received from the second controller extension.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
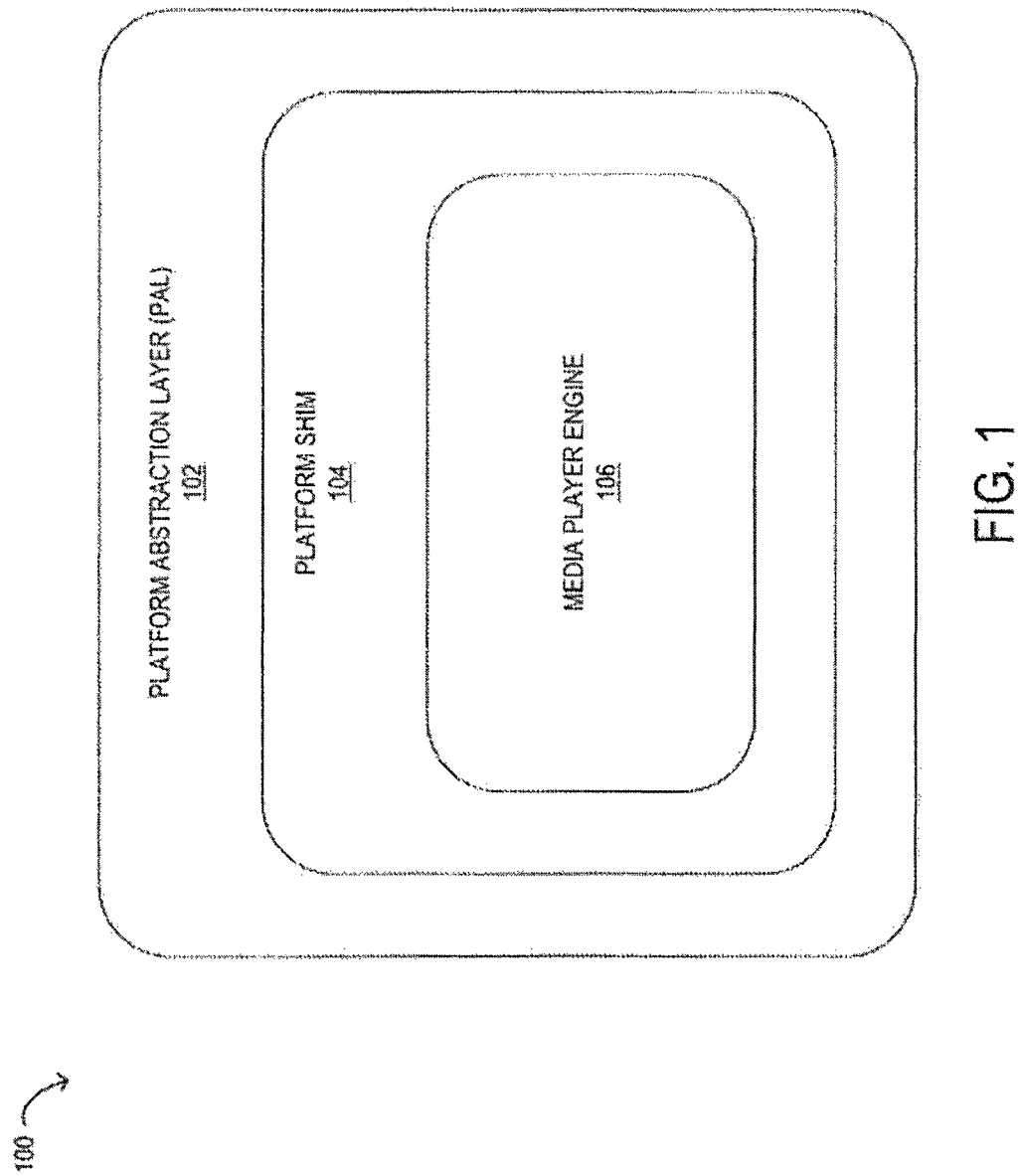
FIG. 1 is a block diagram of selected elements of an embodiment of a media player software system architecture.

In the following description, details are set forth by way of example to facilitate discussion of the disclosed subject matter. It should be apparent to a person of ordinary skill in the field, however, that the disclosed embodiments are provided as examples and are not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Particular embodiments can be understood by reference to FIGS. 1, 2, 3A, 3B, 4, 5A, 5B, 6, 7A, and 7B wherein like numbers are used to indicate like and corresponding parts.

Turning now to the drawings, FIG. 1 illustrates a block diagram depicting selected elements of an embodiment of a media player software system architecture 100, which may allow content supplied by a content management system to run on any media player system and most computing devices in a digital signage system. The content management system may support multiple media player systems. In some embodiments, each media player system may have different hardware components and run different operating systems from each other. Media player software system architecture 100 may support both an on premise and a cloud-based content management system, which may be a public cloud or a private cloud-based system. Media software system architecture 100 may also include a provisioning component that allows a media player system to be authenticated, authorized, and associated with at least one specific tenant of the content management system. Media software system architecture 100 may support single or multi-tenant software as a service (SaaS) solution. As shown in FIG. 1, components of media player software system architecture 100 include, but are not limited to, a platform abstraction layer (PAL) 102, a platform shim 104, and a media player engine 106.

Platform abstraction layer 102 is a hardware abstraction layer that accesses and controls hardware of a media player system and supports a common set of PAL application programming interfaces, which allow applications to control the hardware of the media player system. For example, platform shim 104 and media player engine 106 may utilize the common set of PAL application programming interfaces to discover the capabilities of the hardware and control the hardware of the media player system. Platform abstraction layer 102 may utilize platform application programming interfaces (APIs) corresponding to an operating system of a media player system for communication with the operating system and media player system hardware. Platform abstraction layer 102 may also collect configuration or status data. Configuration data may comprise a list of device and sensor components in the media player system configuration, a type and size of memory, a number of displays included in or coupled to the media player system, display information for each display including the physical dimensions of the display, the resolution or number of pixels of each display, and other appropriate display information. Status data may comprise an amount of free memory available, an amount of free disk space available, central processing unit (CPU) utilization, and other appropriate types of media player system status data. The list of device and sensor components may include a camera device, a proximity sensor, a global position system (GPS) device, infrared sensor, a thermal sensor, a motion detection sensor, an accelerometer, a gyroscope, an image processing device, or other types of on-board or peripheral devices or sensors. Platform abstraction layer 102 may further collect a unique identifier (UID) for generating a provisioning token that may be utilized to provision or configure the media player system, As part of provisioning the media player system, platform abstraction layer 102 may also display a provisioning page and associated provisioning information, collect user provisioning input data, and communicate with other system components to enable the media player system to be provisioned. In a number of embodiments, platform abstraction layer 102 may be installed on a media player system. In some embodiments, platform abstraction layer 102 may be downloaded from a digital signage system.

Platform shim 104 is a translation layer between platform abstraction layer 102 and media player engine 106 such that while platform abstraction layer 102 may be device-specific, media player engine 106 may be device-agnostic because platform abstraction layer 102 provides any necessary translation between the platform abstraction layer 102 and the media player engine 106. Platform shim 104 also provides a common way for the media player system to communicate with the content management system. Platform shim 104 may handle communication between platform abstraction layer 102 and media player engine 106. For example, platform shim 104 may allow media player engine 106 to determine the central processing unit (CPU) utilization of the media player system from platform abstraction layer 102 or to process an internet protocol (IP) address change. Platform shim 104 may also initiate and periodically perform a check-in task or a heartbeat task, which may include communicating with the content management system. The check-in task may periodically collect configuration and status data for the media player system utilizing platform abstraction layer 102 and communicate the current configuration or status data to the content management system, which allows the content management system to determine the configuration, status, or health of the media player system. In some embodiments, the check-in task may only collect the configuration data once during an initialization or configuration process. The periodic check-in may be based on a programmable check-in period such as 15 minutes or any another appropriate check-in period. In other embodiments, the check-in task may not take place periodically and instead take place when particular data (e.g., configuration, status, or health of the media system) changes or upon the occurrence of a particular event. As a result of a check-in communication to the content management system, platform shim 104 may receive check-in instructions from the content management system and may provide the check-in instructions to media player engine 106 for implementation. The check-in instructions may include content to be played by media player engine 106. The heartbeat task may periodically communicate a heartbeat message to the content management system, which includes an indication that the media player system is alive and working and a request for any heartbeat actions that the media player system needs to perform. The periodic heartbeat communication may be based on a programmable heartbeat period such as once a minute or any another suitable heartbeat communication period. In other embodiments, the periodic heartbeat communication may be based on changes to data, or other events that may trigger the heartbeat communication. Platform shim 104 may further implement heartbeat actions received from the content management system resulting from the heartbeat communication. The heartbeat actions may include asking media player engine 106 to check-in with the content management system, download a new scriptlet, to reboot the media player system, upload logs to the content management system, or other actions that media player engine 106 is asked to perform. A scriptlet is also referred herein as a software controller extension.

Media player engine 106 may be hosted in the on premise system or the cloud. Media player engine 106 is a cross-platform software application that works on a plurality of media player operating systems including Windows, MacOS, Linux, and other types of operating systems. In other words, the media play engine 106 may be employed using any appropriate operating system or software language, and as a result can be agnostic to the operating system or software language employed by PAL 102. Media player engine 106 is common to all media player systems including in user interface preview media player systems. Media player engine 106 may be responsible for playing and displaying content supplied by the content management system on one or more media displays, which may be based on check-in instructions received from the content management system. In particular embodiments, media player engine 106 may perform content display and playback according to a content schedule or playlist, which may have been created by an appropriate content builder or development system. The one or media displays may be included in the media player system and/or coupled to the media player system. Media player engine 106 may also implement content scheduling for the content supplied by the content management system. Media player engine 106 may also allow the media player system to be aware of and communicate with other media player systems deployed on a network of the content management system. This may allow the media player system and other media player systems to coordinate with each other, and in some embodiments to serve as a smart grid of connected media player systems.

The check-in instructions can also include rules regarding content to be played by the media player engine 106 and rules regarding layout of the content to be played by the media player engine 106. For example, layouts of the content to be played by the media player engine 106 can include zones, and each zone can include an image, text, video, data, social media, or any other content to be displayed by the media player engine 106. The rules transmitted with the check-in instructions can include fixed layout rules that can provide exact locations for the zones and the colors and images within each zone. For example, if a blue dot is to be placed at x-axis location 300 and y-axis location 150, then the blue dot will be displayed on a rendering device at that exact location regardless of the device being used to display the blue dot. Such a rendering technique can be called "pixel-perfect". The media player engine 106 can interpret the layout rules and provide the interpreted pixel positions to the platform shim 104, and the platform shim 104 can translate the pixel positions for the device-specific PAL 102, which will output each pixel in the perfect position regardless of the display device.

As noted previously, a digital signage system may include a media player system, which may display content on a layout controlled by the media player system. A typical media player system may run instructions to display the content on the layout. Such instructions may be written for the specific hardware and operating system platform of the media player system and sometimes may only be capable of running on that specific type of media player system. This may result in the digital signage system being limited in their support of specific types of media player system. Different instructions may need to be written for other types of media player system to allow the digital system to support those different media player systems. During operation, platform abstraction layer 104 may obtain the network address of the media player system, get the UID for the media player system, and set up a media display area with the resolution of the display, the size of the display, and other information associated with the media display. If the media player system has not been provisioned, platform abstraction layer 104 may display a provisioning page and periodically check if the media player system has been provisioned. When the media player system has been provisioned, platform abstraction layer 104 may download platform shim 104 and media player engine 106 from the content management system. Once platform shim 104 has been downloaded, platform abstraction layer 104 may pass control platform shim 104. Platform shim 104 may start the check-in and heartbeat tasks. When platform shim 104 receives check-in instructions from the content management system, platform shim 104 may start media player engine 106. Media player engine 106 may display content on the media display as defined in the received check-in instructions.

As will be described in further detail herein, the present disclosure describes embodiments of a media player software system architecture and methods that supports a variety of heterogeneous media player systems including different hardware and/or various different operating systems in a digital signage system. In particular embodiments, the media player software system includes is a platform neutral media player engine 106, which may be common to the various heterogeneous media player systems. To support any new media player system, such embodiments may require a limited set of instructions to be written for a platform abstraction layer 102 specific to a particular media player system, while retaining a majority of the platform shim 104 software as common with limited changes to support the new media player system. Embodiments of the media player software system architecture including the platform shim 104 and the media player engine 106 may allow the content management system of the digital signage system to support a new media player system without substantially changing the content management system. Such embodiments may flexibly support the deployment of new media player systems in shorter amounts of time and with minimal effort or customer support. Hosting the platform shim 104 and the media player engine 106 in the on premise system or the cloud may also allow embodiments of the content management system to distribute updated versions of the platform shim 104 and/or the media player engine 106 in a reliable and flexible manner that supports rapid and efficient deployment and minimal downtime. In certain circumstances, updated versions of the platform shim 104 and/or media player engine 106 may support new features for some or all of the media player systems in the digital signage system. In this fashion, embodiments of the media player software system architecture and methods may provide flexibility in developing, supporting, troubleshooting, debugging, testing, upgrading, or adding additional functionality to a digital signage system.

Figure 2:
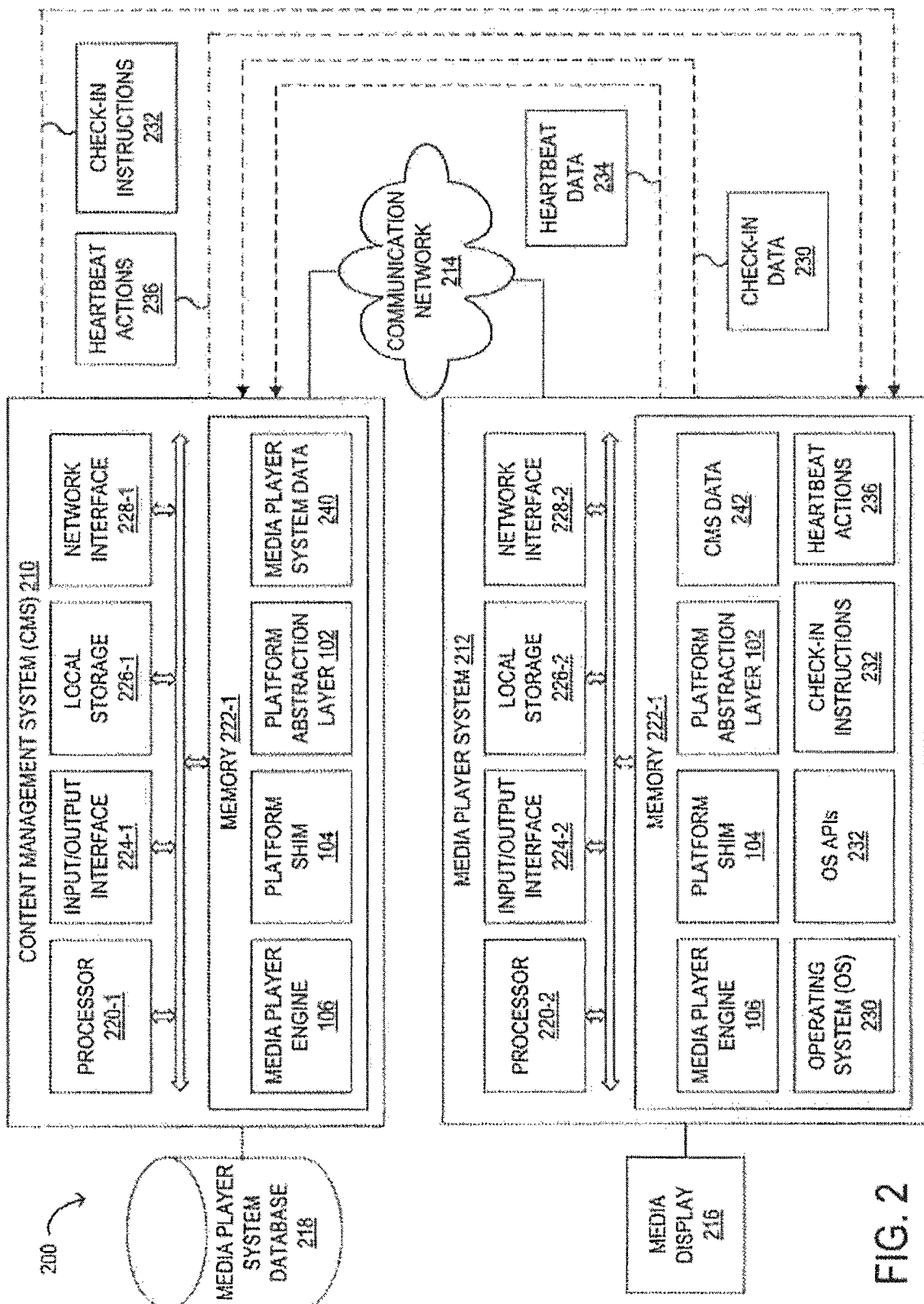
FIG. 2 is a block diagram of selected elements of an embodiment of an example digital signage system based on a media player software system architecture.

Turning now to FIG. 2, a block diagram depicting selected elements of an embodiment of an example digital signage system 200 utilizing a media player software system architecture to play and display content on media player systems. As shown in FIG. 2, components of digital signage system 200 may include, but are not limited to, a content management system (CMS) 210, a media player system 212, a communication network 214, a media display 216, and a media player system database 218. Content management system 210 may be coupled to media player system 212 via communication network 214 and to the media player system database 218. Media player system 212 may be coupled to media display 216. In other embodiments, media player system database 218 may be integrated with of part of content management system 210, and media display 216 may be integrated with of part of media player system 212.

Content management system 210 may represent a server, a desktop computer, among other types of computer systems. Media player system 212 may represent different types of fixed or portable display systems, such as, display devices or screens, smart phones, tablet computers, notebook computers, media players, 2-in-1 tablet-laptop combination computers, teleconferencing systems, or other types of display systems. Media player system 212 may also represent other types of computer systems, including desktop computers, server systems, controllers, and microcontroller units, among other types of computer systems.

Communication network 214 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). In particular embodiments, communication network 214 may include one or more routers for routing data between content management system 210 and media player system 212. A device (e.g., content management system 210 and media player system 212) on communication network 214 may be addressed by a corresponding network address including, for example, an Internet protocol (IP) address, an Internet name, a Windows Internet name service (WINS) name, a domain name or other system name. In particular embodiments, communication network 214 may include one or more logical groupings of network devices such as, for example, one or more sites (e.g. customer sites) or subnets. As an example, a corporate network may include potentially thousands of offices or branches, each with its own subnet (or multiple subnets) having many devices. One or more media player systems 212 may communicate with one or more content management systems 210 via any suitable connection including, for example, a modem connection, a LAN connection including the Ethernet or a broadband WAN connection including DSL, Cable, T1, T3, Fiber Optics, Wi-Fi, or a mobile network connection including GSM, GPRS, 3G, or WiMax.

Communication network 214 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Communication network 214 and its various components may be implemented using hardware, software, or any combination thereof.

Media display 216 may comprise a memory device and a processor coupled to the memory device and operable to execute instructions stored in the memory device. Media display 216 may represent one or more flat panel displays, liquid crystal displays (LCD), plasma displays, projector displays, video monitors, a light emitting diode (LED) video displays, LED video stadium displays, or another type of displays. Media display 216 may also represent a video wall including multiple displays, such as, multiple flat panel displays, or multiple LED video displays. Media player system database 218 may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

Content management system 210 may comprise, but are not limited to, a processor 220-1 and a system bus that communicatively couples various components to processor 220-1 including, for example, a memory 222-1, an input/output (I/O) interface 224-1, a local storage 226-1, and a network interface 228-1. Memory 222-1 may include platform abstraction layer 102, platform shim 104, media player engine 106, and media player system data 240.

Processor 220-1 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. Memory 222-1 may comprise random access memory (RAM), electrically erasable programmable read-only memory (EEPROM), a PCM-CIA card, flash memory, magnetic storage, opto-magnetic storage, and/or a suitable selection and/or array of volatile or non-volatile memory. I/O interface 224-1 may comprise a system, device, or apparatus generally operable to receive and/or transmit data to/from/within content management system 210. I/O interface 224-1 may represent, for example, a variety of communication interfaces, graphics interfaces, video interfaces, user input interfaces, and/or peripheral interfaces. In various embodiments, I/O interface 224-1 may be used to support various peripheral devices, such as a display, a keyboard, a touch pad, a sensor, a camera, a near field communication (NFC) device, an analytics device, a proximity sensor, a global position system (GPS) device, an infrared sensor, a thermal sensor, a motion detector, an accelerometer, a gyroscope, an image processing device, a radio frequency identification (RFID) reader, or another type of peripheral device. Local storage 226-1 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Network interface 228-1 may be a suitable system, apparatus, or device operable to serve as an interface between content management system 210 and communication network 214. Network interface 228-1 may enable content management system 210 to communicate over communication network 214 using a suitable transmission protocol and/or standard, including, but not limited to, transmission protocols and/or standards enumerated above with respect to the discussion of communication network 214.

Media player system 212 may comprise, but are not limited to, a processor 220-2 and a system bus that communicatively couples various components to processor 220-2 including, for example, a memory 222-2, an input/output (I/O) interface 224-2, a local storage 226-2, and a network interface 228-2. Memory 222-2 may include platform abstraction layer 102, platform shim 104, media player engine 106, an operating system (OS) 230, OS application programming interfaces 232, check-in instructions 232, heartbeat actions 236, and CMS data 242.

During operation of embodiments of media player system 212, a user may download platform abstraction layer 102 from content management system 210. Once platform abstraction layer 102 has been successfully loaded from content management system 210, the user may start platform abstraction layer 102. Platform abstraction layer 102 may collect the system's network address, the user identifier (UID), and setup the display area. If media player system 212 has not been provisioned, platform abstraction layer 102 may display the provisioning page, accept user input for authentication, and communicate with content management system 210 to enable appropriate configuration and provisioning of media player system 212. In certain implementations, user input for authentication may require multifactor or multidevice authentication for security purposes. In particular embodiments, the media player system 212 may periodically communicate with the user and/or the content management system 210 to facilitate provisioning of the media player system 212. The periodic check may be based on a programmable provisioning period such as 5 seconds, 15 seconds, 20 seconds, or any another appropriate provisioning period. When media player system 212 has been provisioned, platform abstraction layer 102 may download platform shim 104 from content management system 210. Once platform shim 104 has been downloaded, platform abstraction layer 102 may transfer control to platform shim 104. Platform abstraction layer 102 may also download media player engine 106 from content management system 210. In other implementations, the platform shim may download the media player engine 106 from content management system 210 at an appropriate time. Platform shim 104 may initiate the check-in and heartbeat tasks. Platform shim 104 may transmit check-in data 230 from the check-in task to content management system 210. Upon receiving the check-in data 230 from media player system 212, content management system 210 may transmit check-in instructions 232 to media player system 212. When platform shim 104 receives check-in instructions 232 from content management system 210, platform shim 104 may initiate media player engine 106 and provide check-in instructions 232 to media player engine 106. In certain implementations, the playform shim 104 downloads and initiates media player engine 106 once a check-in instruction 232 returns appropriate instructions to download, install, and run media player engine 106. Next, media player engine 106 may play and display content supplied by content management system 210 on media display 216 based on check-in instructions 232. In appropriate circumstances, media player engine 106 may update the platform shim 104 or media player engine 106 in response to appropriate check-in instructions. While media player engine 106 is displaying content on media display 216, platform shim 104 may transmit heartbeat data 234 from the heartbeat task to content management system 210. When content management system 210 receives heartbeat data 234 from media player system 212, content management system 210 may transmit heartbeat actions 236 to media player system 212. When platform shim 104 receives heartbeat actions 236 from content management system 210, platform shim 104 may provide heartbeat actions 236 to media player engine 106, which may implement heartbeat actions 236.

Figure 3A:
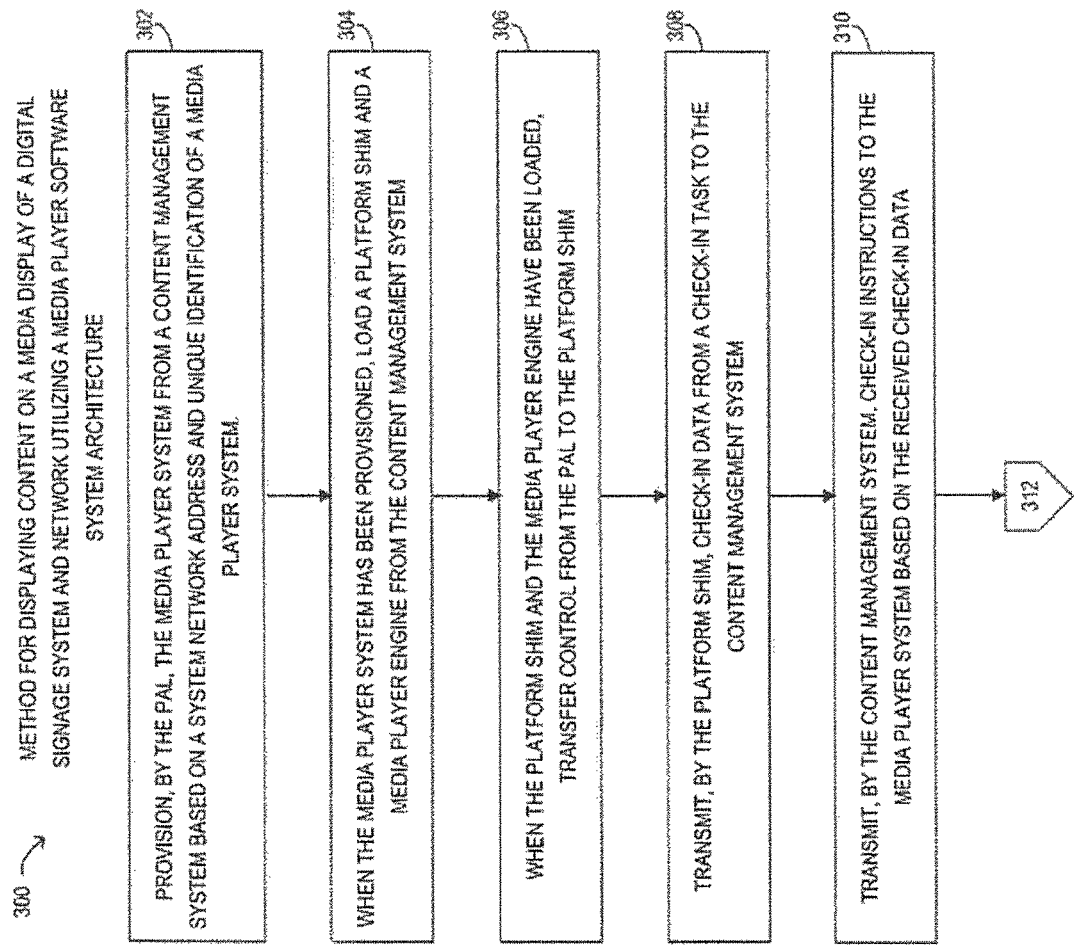
FIGS. 3A and 3B depict a flowchart of selected elements of an embodiment of a method for displaying content on a media display of a digital signage system based on a media player software system architecture.
Figure 3B:
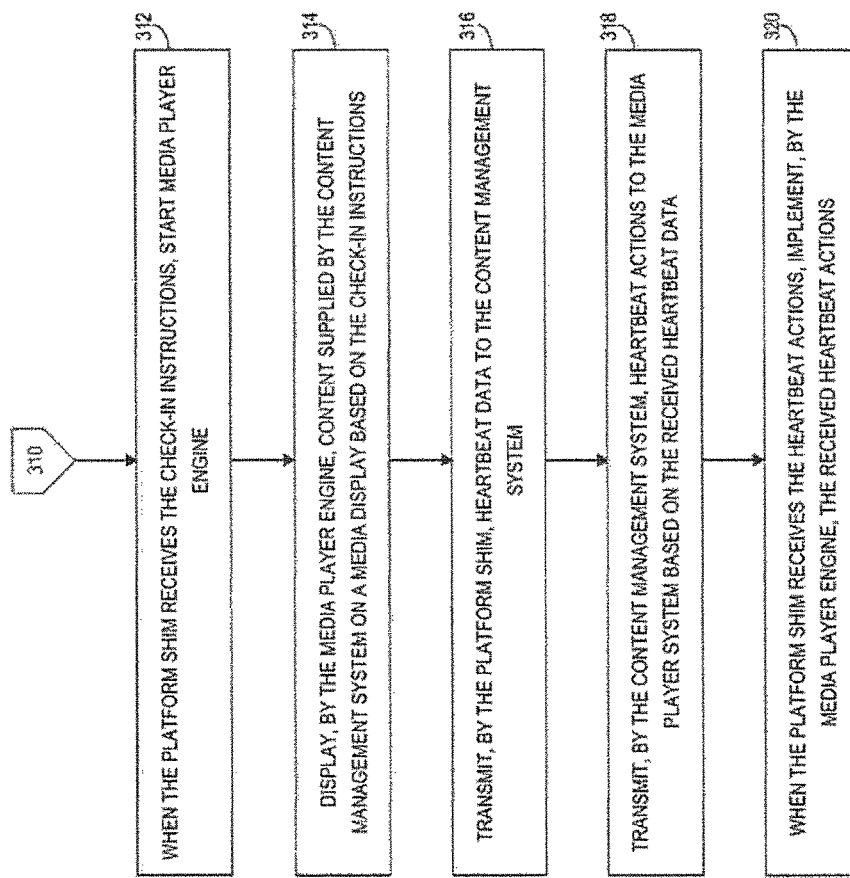

FIGS. 3A and 3B depict a flowchart of selected elements of an embodiment of a method for displaying content on a media display of a digital signage system utilizing a media player software system architecture. Method 300 may be performed by digital system 200, content management system 210, and media player system 212, previously described with reference to FIG. 2, or another digital system. It is noted that certain operations described in method 300 may be optional or may be rearranged as appropriate for different embodiments.

Method 300 may begin at step 302, by provisioning, by the PAL, the media player system from a content management system based on a system network address and unique identification of a media player system. At step 304, when the media player system has been provisioned, loading, by the PAL, a platform shim and a media player engine from the content management system. At step 306, when the platform shim and the media player engine have been loaded, transferring, by the PAL, control from the PAL to the platform shim. At step 308, transmitting, by the platform shim, check-in data from a check-in task to the content management system. At step 310, transmitting, by the content management system, check-in instructions to the media player system based on the received check-in data. At step 312, when the platform shim receives the check-in instructions, starting, by the platform shim, the media player engine. At step 314, displaying, by the media player engine, content supplied by the content management system on a media display based on the check-in instructions. At step 316, transmitting, by the platform shim, heartbeat data to the content management system. At step 318, transmitting, by the content management system, heartbeat actions to the media player system based on the received heartbeat data. At step 320, when the platform shim receives the heartbeat actions, implementing, by the media player engine, the received heartbeat actions.

Figure 4:
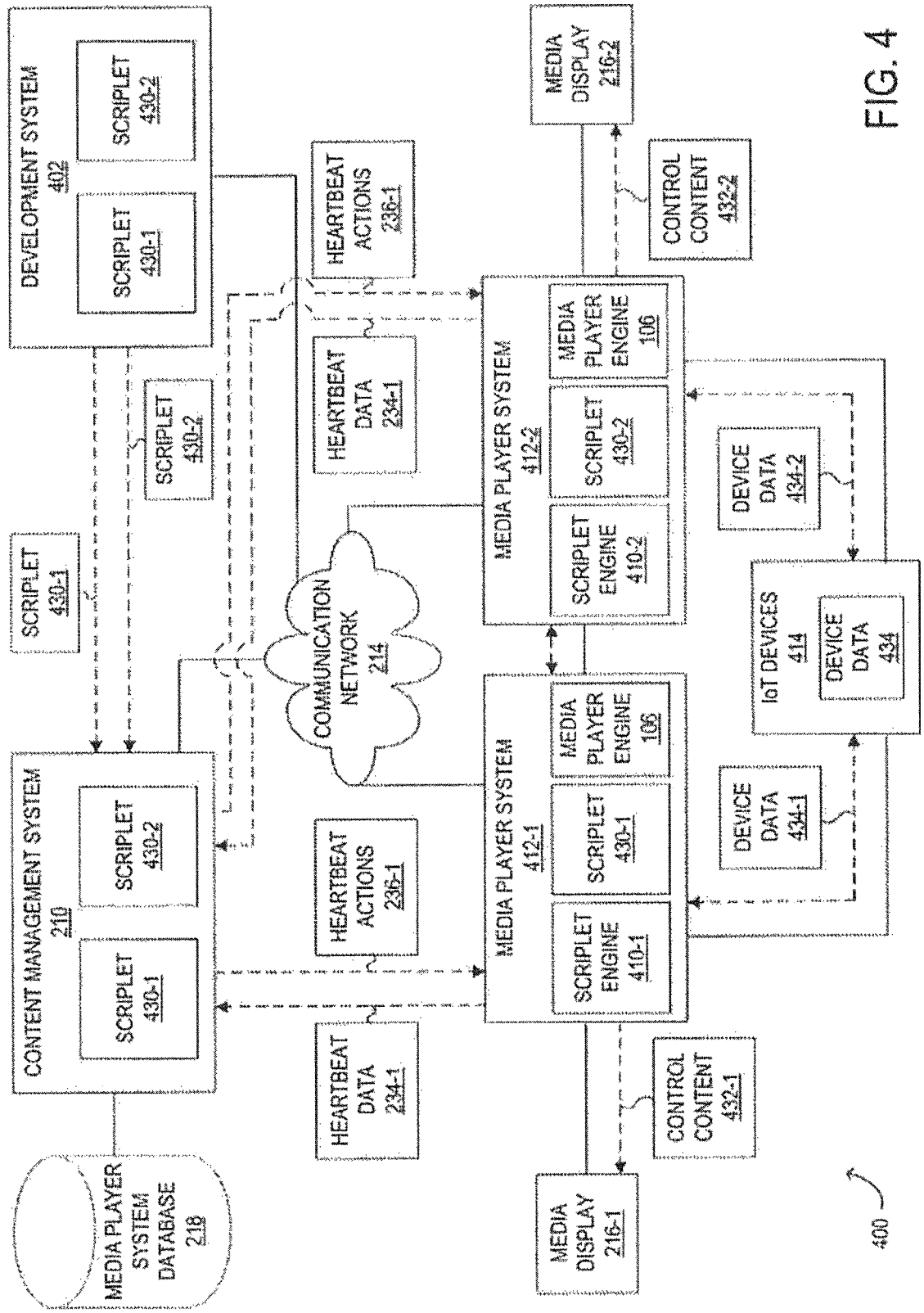
FIG. 4 is a block diagram of selected elements of an embodiment of a software controller extension delivery system for media player systems in a digital signage system based on a media player software system architecture.

Turning now to FIG. 4, a block diagram depicting selected elements of a software controller extension delivery system 400 for media player systems in a digital signage system. As shown in FIG. 4, components of software controller extension delivery system 400 may include, but are not limited to, content management system 210, communication network 214, media displays 216-1 and 216-2, and media player system database 218, as previously described with reference to FIG. 2. Software controller extension delivery system 400 may further comprise, but is not limited to, a development system 402, media player systems 412-1 and 412-2, and internet of things (IoT) devices 414. Each one of media player systems 412-1 and 412-2 is structurally and functionally similar to media player system 212, previously described with reference to FIG. 2, In some embodiments, media player system database 218 may be integrated with or part of content management system 210, media display 216-1 may be integrated with of part of media player system 212-1, or media display 216-2 may be integrated with of part of media player system 212-2. IoT devices 414 may be integrated with or part of media player, system 212-1, or media player system 212-2. Content management system 210, development system 402, and media player systems 412-1 and 412-2 may be coupled to and communicate with each other via communication network 214. Media player system 412-1 may be coupled to IoT devices 414 and media display 216-1. Media player system 412-1 and IoT devices 414 may communicate with each other using two-way communication. Media player system 412-2 may be coupled to IoT devices 414 and media display 216-2. Media player system 412-2 and IoT devices 414 may communicate with each other using two-way communication. Media player systems 412-1 and 412-2 may also be coupled to and communicate with each other using two-way communication. IoT devices 414 may include a near field communication (NFC) device, a drone, a spotlight, a piezo-electric sensor, smart blinds or smart shades, a Bluetooth sensor, an analytics device, a representational state transfer application programming interface (RESTful API) web service, a camera device, a proximity sensor, a global position system (GPS) device, an infrared sensor, a thermal sensor, a motion detection sensor, an accelerometer, a gyroscope, an image processing device, or other types IoT devices. Development system 402 may comprise a server system, a desktop computer, a personal computer, or another type of development system. Development system 402 may comprise an integrated development environment (IDE). A user of software controller extension delivery system 400 may develop a software controller extension on development system 402 utilizing the IDE on development system 402, which may allow the content of a layout being displayed by a media player system, such as media player system 412-1 or media player system 412-2, to change dynamically in real time. The software controller extension is also referred herein as a scriptlet. Scriptlets may be created within the IDE with an ECMA script application programming interface (API), an ECMAscript compliant scripting language, or another type of API, or another type of scripting language. Software controller extension delivery system 400 may allow a user to deliver scriptlets to various media player systems including computer systems, mobile devices, or another type of media player system or computer device. A media player system may utilize these scriptlets to control various hardware devices included in the media player system and/or coupled to the media player system. The hardware devices may include IoT devices 414, a media display 216, or another type of device. A scriptlet may interpret and respond to a radio frequency identification (RFID). The IDE may provide a live preview capability with different display resolutions and modes that allows a scriptlet under development to execute concurrently with a media player engine of development system 402 displaying the content of a layout. This allows the user to view the dynamic changes to the content by the scriptlet under development on the same or another display while the user develops the scriptlet. The live preview capability may be different from a basic simulation of the changes to the content by the scriptlet. The live preview capability may also be different from deploying the scriptlet and the content on an actual hardware display that will be used in the field. Instead, the live preview capability adapts to the deployment environment (e.g., a soccer stadium LED screen) and provides an accurate preview of that on the authoring display. The live preview may be based on display information associated with an ultimate display to be used in active deployment of the scriptlet and content, such as a media display, a display of a mobile device, a display of a personal computer system, a display of a Mac computer, a video wall, an LED display, or a display of another computing device. A personal computer system may comprise a personal computer running a Windows OS, a Linux OS, or another type of OS. A Mac computer represents a personal computer running an Apple OS. In this manner, embodiments of the present disclosure enable a scriptlet developer to receive a live preview under the actual circumstances of the target deployment environment or display system.

During operation of software controller extension delivery system 400, a user develops a scriptlet 430-1 for deployment on media player system 412-1 and a scriptlet 430-2 for deployment on media player system 412-2. Once scriptlets 430-1 and 430-2 are developed, development system 402 transmits scriptlets 430-1 and 430-2 to content management system 210 for delivery to media player systems 412-1 and 412-2, respectively.

Media player system 412-1 transmits heartbeat data 234-1 to content management system 210. In certain implementations, when content management system 210 receives heartbeat data 434-1 from media player system 412-1, content management system 210 may determine that scriptlet 430-1 is to be delivered to media player system 412-1 and may create heartbeat actions 436-1 indicating that scriptlet 430-1 is available and is to be loaded onto media player system 412-1. Next, content management system 210 may transmit heartbeat actions 436-1 to media player system 412-1. In certain embodiments, when platform shim 204 of media player system 412-1 receives heartbeat actions 436-1 from content management system 210, platform shim 104 may provide heartbeat actions 436-1 to media player engine 106, which may download and install scriptlet 430-1 from content management system 210 using platform abstraction layer 102. In such embodiments, media player engine 106 may next start a scriptlet engine 410-1 to execute and run scriptlet 430-1 concurrently or in parallel with media player engine 106. Scriptlet 430-1 may request device data 434-1 from IoT devices 414. When scriptlet 430-1 receives device data 434-1 from IoT devices 414, control content 432-1 may alter the content displayed on the layout being displayed on media display device 216-1 by media player engine 106.

For example, scriptlet 430-1 may receive RFID badge data of a user and the content may be altered to tell the user which meeting room to go to. Other examples, may include receiving RFID badge data of a user and the content may be altered to tell the user they have been clocked in or clocked out, receiving human recognition data and the content may be altered to display relevant literature, advertisements about a product or other content based on whether the human recognition data indicates that an adult, a child, a female, or a male has been detected, or receiving barcode reader data and the content may be altered to display the price and the features of the scanned product and where to find it.

Alternatively, the scriptlet 430-1 may receive input data from piezo-electric tiles or sensors, and the scriptlet 430-1 may alter a display screen in response to the input from the piezo-electric tiles. For example, upon activation of a certain combination of the piezo-electric tiles, the scriptlet 430-1 can display a special animation on the media display 216-1.

Alternatively, the scriptlet 430-1 may control a drone equipped with a spotlight, and the scriptlet 430-1 can command the drone to fly to certain coordinates in a theater to light up important aspects of the theater or a stage of the theater at specific portions of a theatrical performance. For example, the drone might fly above and illuminate an actor in the middle of the stage during a monologue or solo. The scriptlet 430-1 may receive positioning data from a positioning sensor associated with the actor in order to determine the coordinates to be provided to the drone.

As yet another example, the scriptlet 430-1 can receive image data from a camera to determine whether a human being is lingering or pausing at an advertisement displayed on a media display 216-1. For example, the scriptlet 430-1 can determine that the human being is lingering by detecting the human being in image data from the camera for more frames than a predetermined amount of frames or for longer than a predetermined period of time. In response to detecting that the human being is lingering or pausing, the scriptlet 430-1 may display additional information to the lingering human being on the media display 216-1. The lingering by the human being can be interpreted by the scriptlet 430-1 as interest in the displayed advertisement. As such, the scriptlet 430-1 can display a second screen or an augmented version of a first screen on the media display 216-1 to display additional information. In some embodiments, the second screen might ask the lingering human being whether they would desire more information or to purchase the item or service displayed on the first screen.

As another example, the scriptlet 430-1 may receive information about a displayed video and control shades or blinds in response to the information about the displayed video. For example, during a tense scene of the displayed video, the scriptlet 430-1 may close the shades or blinds to set a mood for the scene. Furthermore, the scriptlet 430-1 may open the shades or blinds when the tense scene ends. In yet another example, too much sunlight might add glare to a video screen, thereby inhibiting a user's ability to clearly see that which is presented on a screen. As such, the scriptlet 430-1 may also receive illumination data from within a room associated with the media display 216-1, and the scriptlet 430-1 may close the blinds or shades when a video is being played and when the illumination exceeds a threshold (i.e. too bright).

In yet another example, the scriptlet 430-1 can communicate with a Bluetooth receiver. The Bluetooth receiver can determine whether a nearby individual has a particular application installed on his or her mobile device. When the Bluetooth receiver detects that the particular application is installed on the nearby individual's mobile device, the scriptlet 430-1 can receive an indication that the particular application is installed on the nearby individual's mobile device and augment or change the information displayed on the media display 216-1 to display something more personalized for the nearby individual. For example, the scriptlet 430-1 can cause the media display 216-1 to display a name of the nearby individual.

In yet one more example, the scriptlet 430-1 can link a display to a plurality of items on sale. In this example, each item, such as shoes displayed at a shoe store, can be associated with an NFC device. Each NFC device can detect whether an associated shoe has been lifted by a customer off a display rack, and in response, the scriptlet 430-1 can display a message on the media display 216-1 about the particular shoe that was picked up. For example, the scriptlet 430-1 can display a Nike logo or animation when a customer lifts and looks at a Nike shoe, or the scriptlet 430-1 can display an Adidas logo or animation when a customer lifts and looks at an Adidas shoe. Additionally or alternatively, the scriptlet 430-1 can display the price of the item picked up by the customer.

Similarly, media player system 412-2 may transmit heartbeat data 234-2 to content management system 210. In certain implementations, when content management system 210 receives heartbeat data 434-2 from media player system 412-2, content management system 210 may determine that scriptlet 430-2 is to be delivered to media player system 412-2 and may create heartbeat actions 436-2 indicating that scriptlet 430-2 is available and is to be loaded onto media player system 412-2. Next, in certain embodiments, content management system 210 may transmit heartbeat actions 436-2 to media player system 412-2. When platform shim 104 of media player system 412-2 receives heartbeat actions 436-2 from content management system 210, platform shim 104 may provide heartbeat actions 436-2 to media player engine 106, which may load scriptlet 430-2 from content management system 210 using platform abstraction layer 102. In certain implementations, media player engine 106 may next start a scriptlet engine 410-2 to execute and run scriptlet 430-2 concurrent with media player engine 106. Scriptlet 430-2 may request device data 434-2 from IoT devices 414. When scriptlet 430-2 receives device data 434-2 from IoT devices 414, control content 432-2 may alter the content displayed on the layout being displayed on media display device 216-2 by media player engine 106. In certain embodiments, developing and distributing scriptlets in this manner may allow the scriptlets to be dynamically deployed to one or more media player systems without the need to modify the hardware or software of the media player systems.

In some embodiments, media player systems 412-1 and 412-2 may be coupled to each other and to other media player systems 412 in a media player systems grid. A scriptlet 430 executing on one media player system 412 may cause the content to change on one or more other media player systems 412. For example, scriptlet 430-1 executing on media player system 412-1 may communicate with scriptlet 430-2 on media player system 412-2, which may cause the content being displayed on media display 216-2 by media player system 412-2 to dynamically change in real time on media display 216-2.

Figure 5A:
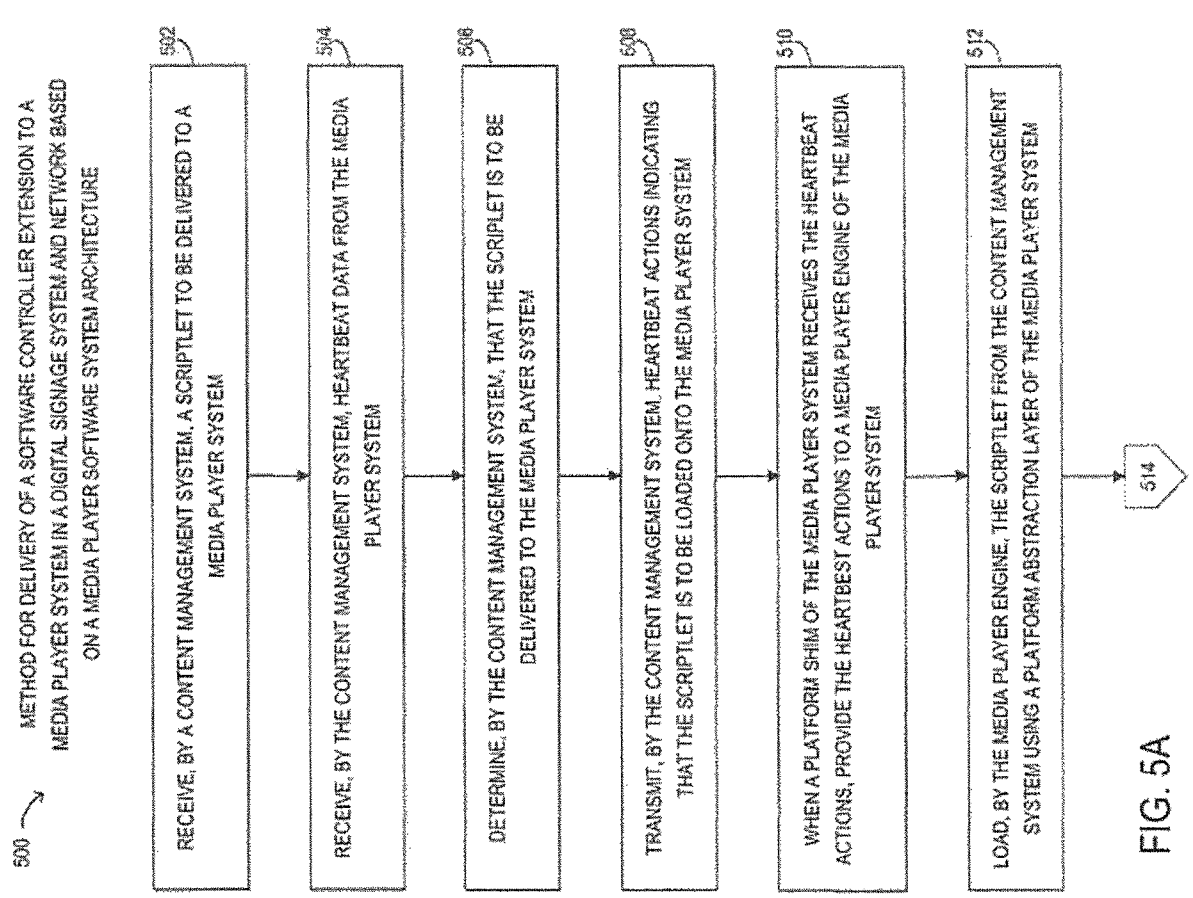
FIGS. 5A and 5B depict a flowchart of selected elements of an embodiment of a method for delivery of a software controller extension to a media player system in a digital signage system based on a media player software system architecture.
Figure 5B:
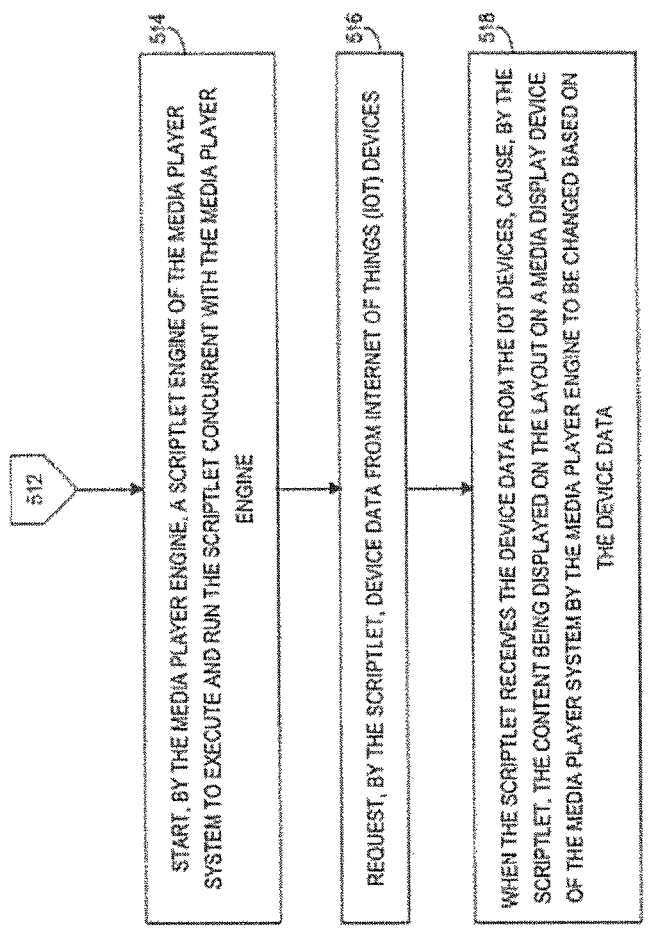

FIGS. 5A and 5B depict a flowchart of selected elements of an embodiment of a method for delivery of a software controller extension to a media player system in a digital signage system based on a media player software system architecture. Method 500 may be performed by digital system 200, content management system 210, and media player system 212, previously described with reference to FIG. 2, or another digital system. It is noted that certain operations described in method 500 may be optional or may be rearranged as appropriate in different embodiments.

Method 500 may begin at step 502, by receiving, by a content management system, a scriptlet to be delivered to a media player system. At step 504, receiving, by the content management system, heartbeat data from the media player system. At step 506, determining, by the content management system, that the scriptlet is to be delivered to the media player system. At step 508, transmitting, by the content management system, heartbeat actions indicating that the scriptlet is to be loaded onto the media player system. At step 510, when a platform shim of the media player system receives the heartbeat actions, providing, by the platform shim, the heartbeat actions to a media player engine of the media player system. At step 512, loading, by the media player engine, the scriptlet from the content management system using the platform shim. At step 514, starting, by the media player engine, a scriptlet engine of the media player system to execute and run the scriptlet concurrent with the media player engine. At step 516, requesting, by the scriptlet, device data from internet of things (IoT) devices. At step 518, when the scriptlet receives the device data from the IoT devices, causing, by the scriptlet, the content being displayed on the layout on a media display device of the media player system by the media player engine to be changed based on the device data.

Figure 6:
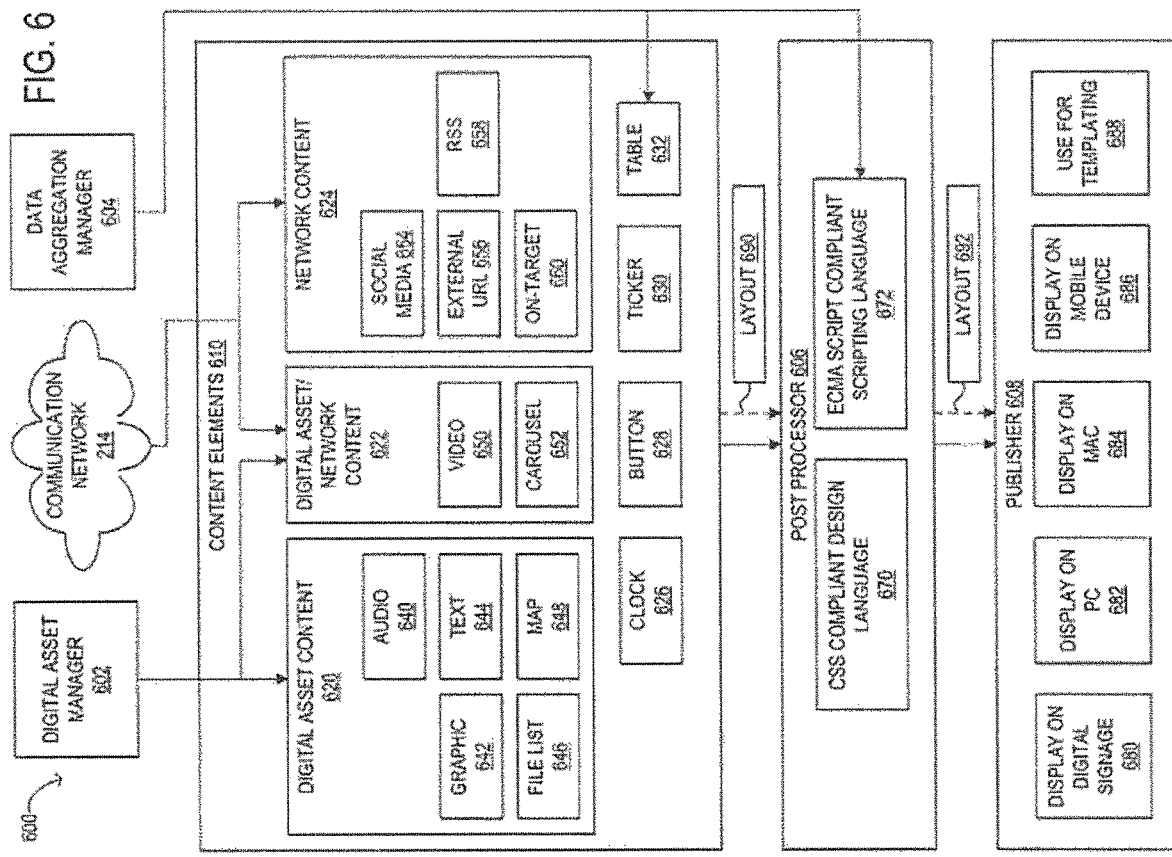
FIG. 6 is a usage flow diagram depicting selected elements of an embodiment of an example method for building content for a digital signage system based on a media player software system architecture.

Turning now to FIG. 6, FIG. 6 is a usage flow diagram depicting selected elements of an embodiment of a content builder 600 for building content for a digital signage system. Content builder 600 provides a development environment for authoring content, playlists, and layouts. A playlist may include layouts. Layouts may include instructions, code, files, tables, and scriptlets. FIG. 6 represents a combination of hardware, such as a processor, a memory, an I/O interface, and a database, and appropriate instructions and algorithms implementing the features of the content builder 600. Digital signage system may be digital signage system 200, content management system 210, and media player system 212, previously described with reference to FIG. 2, or another digital signage system. As shown in FIG. 6, components of content builder 600 may include, but are not limited to, a digital asset manager 602, a data aggregation manager 604, a post processor 606, and a publisher 608. Digital asset manager 602, data aggregation manager 604, post processor 606, and a publisher 608 may be coupled to and communicate with each other via communication network 214. Content builder 600 may also comprise layouts that may be utilized on multiple channels/outputs, for example, a mobile device, a desktop computer, a media display, a digital signage device, or another type of channel/output. Content builder 600 may enable users to access third-party content. Embodiments of content builder 600 may toggle between videos, images, and other layouts with content rotating functionality. Content builder 600 may also include an integrated development environment (IDE) that enables users to build any hypertext markup language (HTML) web and mobile user experience such as an HTML5 web user experience. Content builder 600 may further include pre-designed software code that may be utilized to auto-populate data tables and other visual elements that are bound to a subscription service of a digital signage user, for example, a Cisco subscription service.

Content builder 600 may further provide a live preview capability with different display resolutions and modes that allows the current content and layout under development to be viewed on the same or another display monitor while the user dynamically changes and develops content. The live preview capability may be different from a basic simulation of the current content and layout. The live preview capability may also differ from deploying the current content and layout on an actual hardware display that will be used in the field. Instead, the live preview capability adapts to the deployment environment (e.g., a soccer stadium LED screen) and provides an accurate preview of that on the authoring display monitor.

The live preview of the layout may be rendered by a preview engine on a display. The preview engine may emulate a media player engine 106 and may be based on the media player software system architecture. The preview display size may be custom, preset, or dynamic/auto-adjustment based on the layout and the display. The auto-adjustment allows for a drop-down selection of options within content builder 600. The preview engine may display the live preview of the layout based on a preview event received from content builder 600. In some embodiments, the preview engine may periodically poll for new layout information and display a live preview of the updated layout when new layout information is available. The preview engine may poll for new layout information every 25-250 milliseconds, or another appropriate time period. This allows the user to see the preview of the current content under development in realtime as the user develops content. The live preview may be based on display information associated with ultimate display to be used in active deployment of the content, such as a media display, a display of a mobile device, a display of a personal computer system, a display of a MAC computer, a video wall, an LED display, or a display of another computing device. A personal computer system may comprise a personal computer running a Windows OS, a Linux OS, or another type of OS. A Mac computer represents a personal computer running an Apple OS. In this manner, embodiments of the present disclosure enable a content developer to receive a live preview under the actual circumstances of the target deployment environment or display system.

During operation, a user may create a new layout or edit an existing layout, which may include one or more of creating new content elements, editing existing content elements, and/or deleting existing content elements. A content element is type of content that may be displayed in a layout and may comprise video content, audio content, graphic content, textual content, or another type of content element. Digital asset manager 602 may further provide digital asset/network content 622, which may comprise one or more of a video content element 650 and a carousel content element 652. Carousel content element 652 may include two or more images, videos, headlines, or other content elements. Digital asset manager 602, data aggregation manager 604, and communication network 214 may provide content elements 610 for inclusion in a layout 690 as part of development of layout 690. For example, digital asset manager 602 may provide one or more of an audio content element 640, a graphic content element 642, a text content element 644, a file list content element 646, a map content element 648, or another type of content element. Digital asset manager 602 may further provide digital asset/network content 622, which may comprise one or more of a video content element 650 and a carousel content element 652. Carousel content element 652 may include two or more images, videos, headlines, or other content elements, which may be displayed in a rotating fashion. For example, a first image may be displayed followed by a second image, followed by a first video, followed by a second video, and rotating back to the first image in the same sequence. Communication network 214 may also provide digital asset/network content 622, which may comprise one or more of video content element 650 and carousel content element 652. Communication network 214 may further provide network content 624 comprising one or more of a social media content element 654, an external uniform resource locator (URL) content element 656 of a world wide web resource, a rich site summary (RSS) content element 658 of a world wide web feed, an on-target content element 660, or another type of content element. Data aggregation manager 604 may provide a table content element 632, which may be a visual element of a subscription service. Data aggregation manager 604 may convert textual data to a visual format such as a table, a pie graph, a bar graph, or another type of visual data. Content elements 610 may also comprise one or more of a clock content element 626, a button 628, and a ticker content element 630. Clock content element 626 may represent date and time clock content, which updates in real time, or a countdown clock or timer for an appropriate event. Button 628 may comprise a web button, button graphics, a badge, or a sticker. Button 628 may be utilized to provide information, enable navigation through displayed content, or for any other appropriate interactive purpose. Ticker content element 630 allows the ticker content to scroll across the layout, which may include text, image lists, custom styled items, or another type of informational ticker content During the development of layout 690, the user may utilize the live preview capability of content builder 600 to render the current content and layout 690 under development for live preview. In this manner, embodiments of the present disclosure allow content developers to preview an accurate depiction of the current layout 690 substantially as it would appear on the target deployment display without pushing the content to the actual display in the field. Such embodiments may also permit the content developer to make any appropriate edits or updates to ensure the final content layout meets the development objectives. When the content developer is satisfied with the current layout 690, content builder 600 may transfer control to post processor 606.

In particular embodiments, post processor 606 may utilize one or more of a cascading style sheets (CSS) compliant design language 670 such as CSS3-compliant design language and an European computer manufacturers association script (ECMAscript) compliant scripting language 672 to create content for a final version of layout 692, modify content of the final version of layout 692, and/or add additional functionality to the final version of layout 692. CSS may enable the separation of presentation and content, including layout, colors, and fonts, which may improve content accessibility, provide flexibility and control in the specification of presentation characteristics, enable multiple layouts or web pages to share formatting, and educe complexity and repetition in the structural content. The live preview capability of content builder 600 may also be utilized to allow the content developer to preview the final version of layout 692 during post processing. When the user is satisfied with the post processed final version of layout 692, content builder 600 may transfer control to publisher 608.

Publisher 608 may save final version of layout 692 inducting the layout content for display and/or templating. Publisher 608 may also publish the final version of layout 692 to one or more media players such as media player system 212 described above with reference to FIG. 2 and/or one or more other suitable display devices. Publisher 608 may publish the final version of layout 692 for display on one or more of a digital signage device 680, a personal computer 682 running a Windows OS, a Linux OS, or another OS, a Mac 684 personal computer running an Apple OS, a mobile device 686 running a mobile OS such as an Apple iOS, an Android OS, a Windows Phone OS, or another type of mobile operating system, media player system 212, or another type of computing device. Digital signage device 680, personal computer 682, Mac 684, and mobile device 686 may include platform abstraction layer 102, platform shim 104, and/or media player engine 106 to play and display the published version of layout 692 on these devices and systems. Publisher 608 may further save the published version of layout 692 including the layout content for use as a layout template 688, which may form the basis for additional layouts.

Figure 7A:
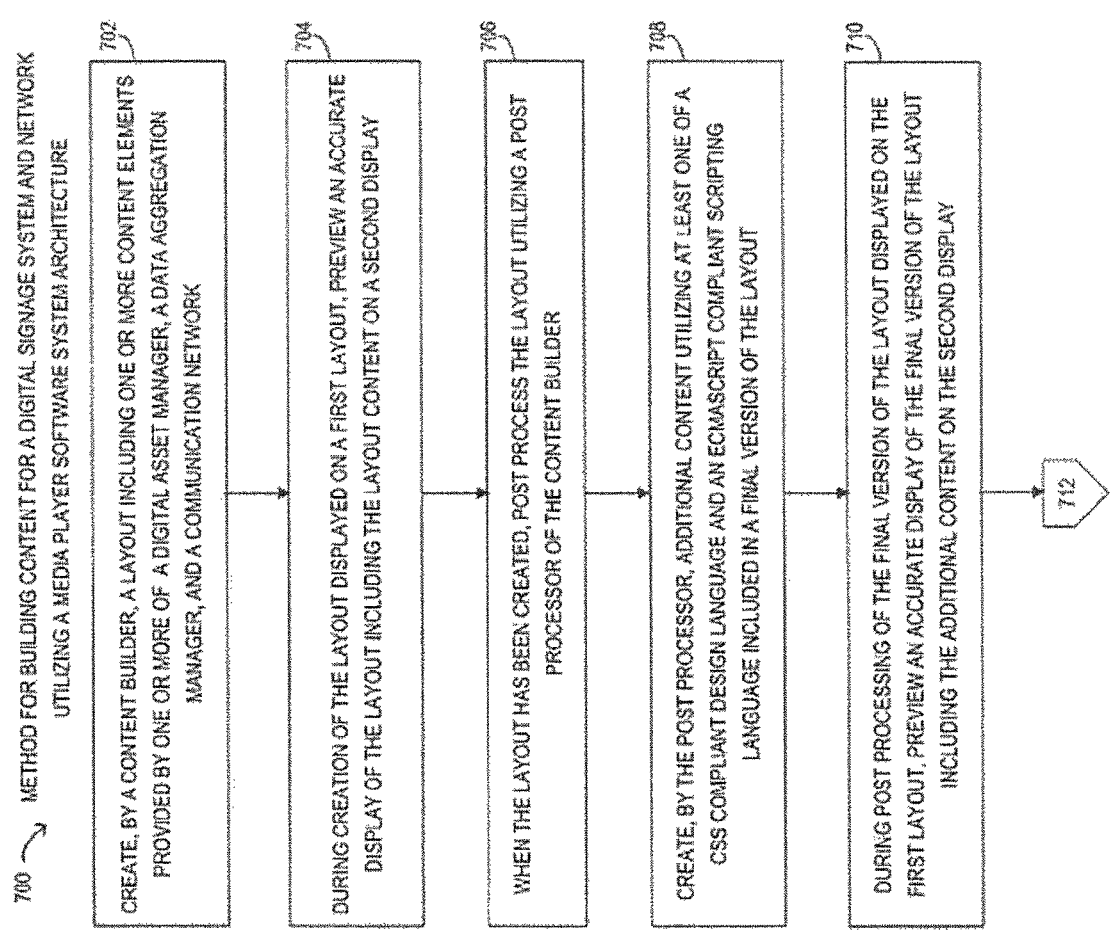
FIGS. 7A and 7B depict a flowchart of selected elements of an embodiment of a method for building and developing content for a digital signage system based on a media player software system architecture.
Figure 7B:
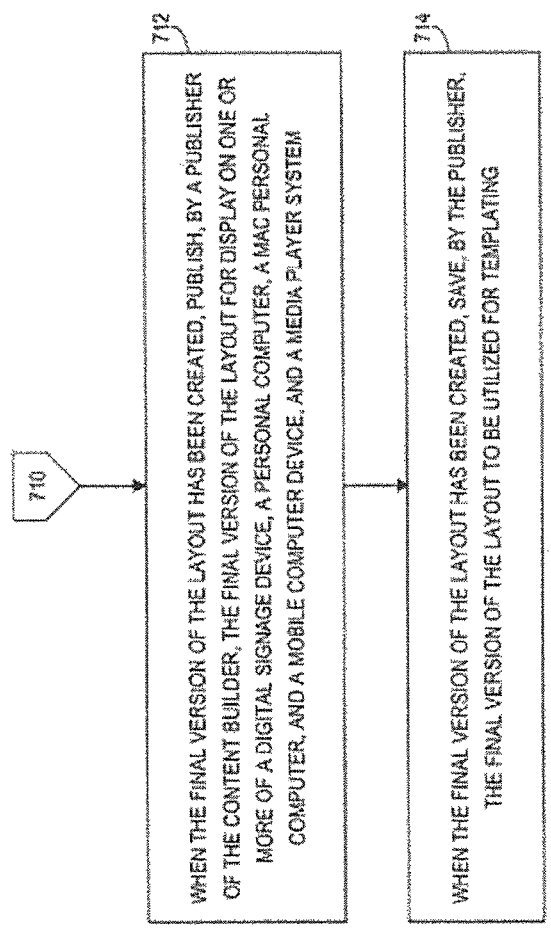

FIGS. 7A and 7B are a flowchart depicting selected elements of an embodiment of a method for building content for a digital signage system utilizing a media player software system architecture. Method 700 may be performed by digital signage system 200, content management system 210, and media player system 212, previously described with reference to FIG. 2, or another digital signage system. It is noted that certain operations described in method 700 may be optional or may be rearranged in different embodiments.

Method 700 may begin at step 702, by creating, by a content builder, a layout including one or more content elements provided by one or more of a digital asset manager, a data aggregation manager, and a communication network. At step 704, during creation of the layout displayed on a first layout, previewing, by the content builder, an accurate display of the layout including the layout content on a second display. At step 706, when the layout has been created, post processing, by a post processor of the content builder, the layout. At step 708, creating, by the post processor, additional content utilizing at least one of a CSS compliant design language and an ECMAscript compliant scripting language included in a final version of the layout. At step 710, during post processing of the final version of the layout displayed on the first layout, previewing, by the content builder, an accurate display of the final version of the layout including the additional content on the second display. At step 712, when the final version of the layout has been created, publishing, by a publisher of the content builder, the final version of the layout for display on one or more of a digital signage device, a personal computer, a Mac personal computer running an Apple OS, and a mobile computer device, and a media player system. At step 714, when the final version of the layout has been created, saving, by the publisher, the final version of the layout to be utilized for templating.

Figure 8:
FIG. 8 illustrates an exemplary layout created using the content builder illustrated in FIG. 6.

FIG. 8 illustrates an exemplary layout 800 created using the content builder illustrated in FIG. 6. As shown, the exemplary layout 800 includes a plurality of zones 802-810. A first zone 802 can display a static image, such as a logo. A second zone 804 can display a current time, and the second zone 804 can update in real-time to reflect a current time. A third zone 806 can display a three-day weather forecast, and the three-day weather forecast can pull data from a weather provider (e.g. weather.com) and update in real-time as new or updated forecasts become available. A fourth zone 808 can display contact center metrics, which also reflect real-time data received from a central server. Each of the metrics can also be laid out in their own respective zone. Lastly, a fifth zone 810 can display an alert indicating whether or not the contact center metrics are excellent, adequate or poor. Using the systems and methods described herein, the exemplary layout 800 would appear identical on any display device. For example, the exemplary layout 800 would look identical displayed on either a mobile device screen or a 50-foot jumbotron.

FIG. 8 also displays a content editing tool 812 that allows a user or content builder to change the layout or content in the exemplary layout 800. Using the content editing tool 812, the content builder can also resize or reorganize the various zones 802-810 of the exemplary layout 800.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. An apparatus comprising:
   a media display configured to display content;
   a processor;
   a media player engine comprising first instructions executable by the processor to display content in accordance with check-in instructions and to output content display data;
   a platform abstraction layer (PAL) comprising second instructions executable by the processor to discover configuration data related to hardware associated with the media display and to support a common set of platform application programming interfaces (APIs) according to the discovered hardware to be used by the media player engine to display the content on the media display in accordance with the check-in instructions;
   a platform shim comprising third instructions executable by the processor to receive the check-in instructions from a content management system and translate the content display data from the media player engine to be used by the PAL for display of the content on the media display in accordance with the check-in instructions.

2. The apparatus of claim 1 wherein the media player engine is agnostic to the hardware and an operating system of the media display.

3. The apparatus of claim 1 wherein the check-in instructions comprise layout rules regarding the content including zones of the content and exact locations of colors and images to be displayed the media display.

4. The apparatus of claim 1 wherein the configuration data comprises a list of devices and sensors in the media display, a type and size of memory, physical dimensions of the media display, a resolution of the media display, an amount of free memory available, an amount of free disk space available, or utilization of the processor.

5. The apparatus of claim 1 wherein the PAL further comprises fourth instructions executable by the processor to provision the media display by collecting a unique identifier of the media display and communicating the unique identifier of the media display to the content management system.

6. The apparatus of claim 1 wherein the platform shim is further configured to send the configuration data to the content management system, and wherein the platform shim receives the check-in instructions in response to sending the configuration data to the content management system.

7. The apparatus of claim 1 wherein the platform shim is further configured to:
   transmit heartbeat data to the content management system; and
   receive heartbeat actions from the content management system based on the heartbeat data,
   wherein the media player engine implements the heartbeat actions.

8. The apparatus of claim 7 wherein the heartbeat data indicates that the media display is working and includes a request for the heartbeat actions.

9. The apparatus of claim 7 wherein the heartbeat actions include requesting the check-in instructions from the content management system, downloading a scriptlet, rebooting the media display, or uploading logs to the content management system.

10. The apparatus of claim 1 wherein the media player engine is further configured to transmit second content to a second media display system, and wherein a second media player engine of the second media display system displays the second content.

11. A method comprising:
    discovering, by a platform abstraction layer (PAL), configuration data related to hardware associated with a media display;
    generating and supporting, by the platform abstraction layer, a common set of platform application programming interfaces (APIs) for displaying content on the media display according to the discovered hardware;
    receiving, by a platform shim, check-in instructions from a content management system; and
    causing, by a media player engine, the media display to display the content in accordance with the check-in instructions by using the common set of platform APIs generated by the PAL.

12. The method of claim 11 wherein the media player engine is agnostic to the hardware and an operating system of the media display.

13. The method of claim 11 wherein the check-in instructions comprise layout rules regarding the content including zones of the content and exact locations of colors and images to be displayed on the media display.

14. The method of claim 11 wherein the configuration data comprises a list of devices and sensors in the media display, a type and size of memory, physical dimensions of the media display, a resolution of the media display, an amount of free memory available, an amount of free disk space available, or utilization of a processor.

15. The method of claim 11 further comprising provisioning, by the PAL, the media display by collecting a unique identifier of the media display; and
    communicating, by the PAL, the unique identifier of the media display to the content management system.

16. The method of claim 11 further comprising:
    sending, by the platform shim, the configuration data to the content management system; and
    receiving, by the platform shim, the check-in instructions in response to sending the configuration data to the content management system.

17. The method of claim 11 further comprising:
    transmitting, by the platform shim, heartbeat data to the content management system; and
    receiving, by the platform shim, heartbeat actions from the content management system based on the heartbeat data,
    wherein the media player engine implements the heartbeat actions.

18. The method of claim 17 wherein the heartbeat data indicates that the media display is working and includes a request for the heartbeat actions.

19. The method of claim 17 wherein the heartbeat actions include requesting the check-in instructions from the content management system, downloading a scriptlet, rebooting the media display, or uploading logs to the content management system.

20. The method of claim 11 further comprising transmitting second content to a second media display system, wherein a second media player engine of the second media display system displays the second content.

* * * * *